United States Patent [19]

Lambert

[11] 4,063,656
[45] Dec. 20, 1977

[54] SYSTEM AND APPARATUS FOR MOVING AND UNLOADING ARTICLES

[75] Inventor: Gerald G. Lambert, Brookfield, Wis.

[73] Assignee: Rexnord Inc., Milwaukee, Wis.

[21] Appl. No.: 699,568

[22] Filed: June 24, 1976

[51] Int. Cl.² .............................................. B65G 67/24
[52] U.S. Cl. ................................... 214/62 A; 214/58; 214/46; 105/241 C
[58] Field of Search ............... 214/62 A, 62 R, 60–61, 214/58, 63; 105/241 C, 377, 286; 198/365; 298/23 R, 23 DF; 222/505, 477, 504, 462

[56] References Cited

U.S. PATENT DOCUMENTS

| | | | |
|---|---|---|---|
| 1,016,570 | 2/1912 | Lawton | 214/62 A |
| 1,266,630 | 5/1918 | Ross et al. | 214/63 |
| 2,160,303 | 5/1938 | Card | 214/62 A |
| 3,712,248 | 1/1973 | Floehr | 105/286 |
| 3,790,008 | 2/1974 | Joubert | 214/63 |
| 3,872,796 | 3/1975 | Adler et al. | 105/241 C |
| 3,994,238 | 11/1976 | Adler | 214/58 |

Primary Examiner—Robert G. Sheridan
Assistant Examiner—Lawrence E. Williams
Attorney, Agent, or Firm—Rexnord Inc.

[57] ABSTRACT

A system for moving and unloading articles includes a movable carriage having a container which is pivotably mounted upon the carriage and adapted to carry a plurality of loose articles. As the carriage moves toward an unloading station, the container pivots about its axis. During approximately the same time interval, a door which is pivotably mounted to the container is unlatched and pivots toward its open position. Preferably, the time sequence is such that the door is fully opened prior to the container reaching its maximum pivot angle. The pivot angle of the container is greater than the angle of repose on the articles, thereby causing the articles to slide out of the container across the open door and onto a conveyor which forms part of an unloading station. After the articles are unloaded, the carriage moves away, the door is closed, and the container tilts back to its normal position.

7 Claims, 12 Drawing Figures

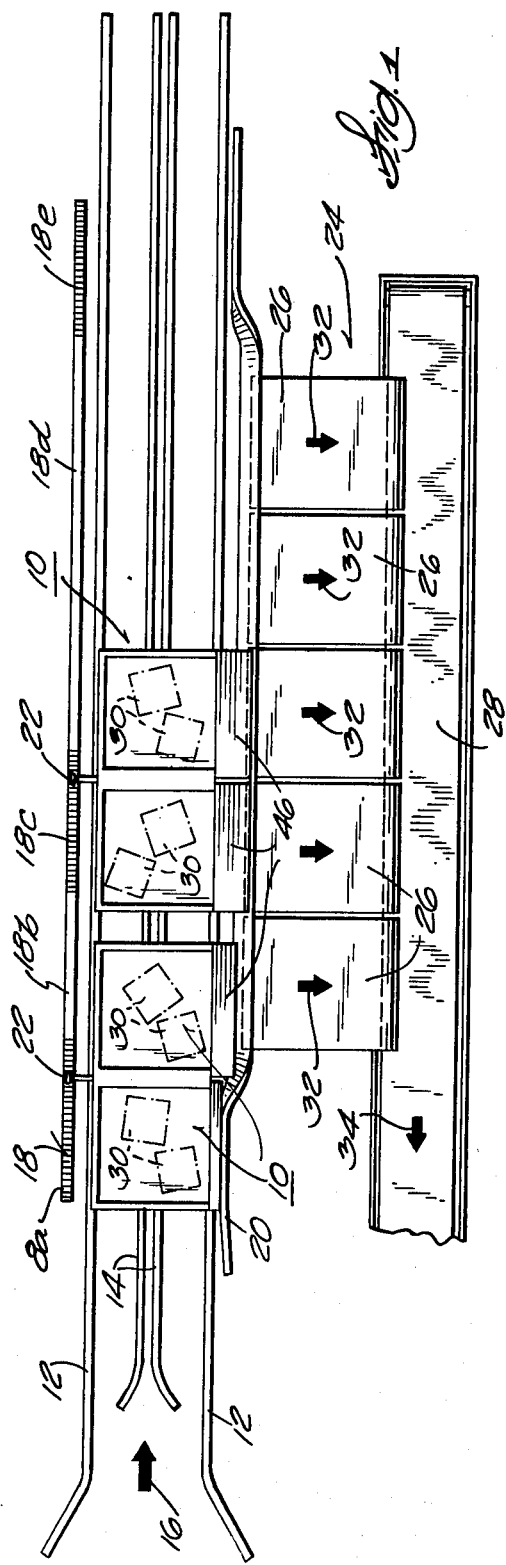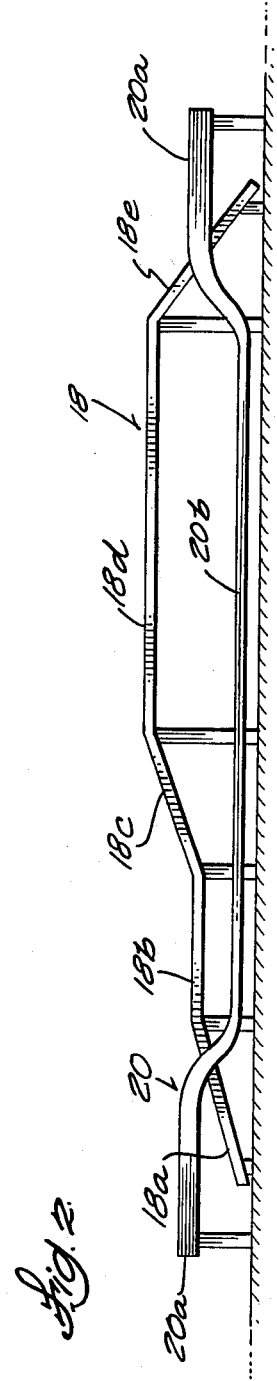

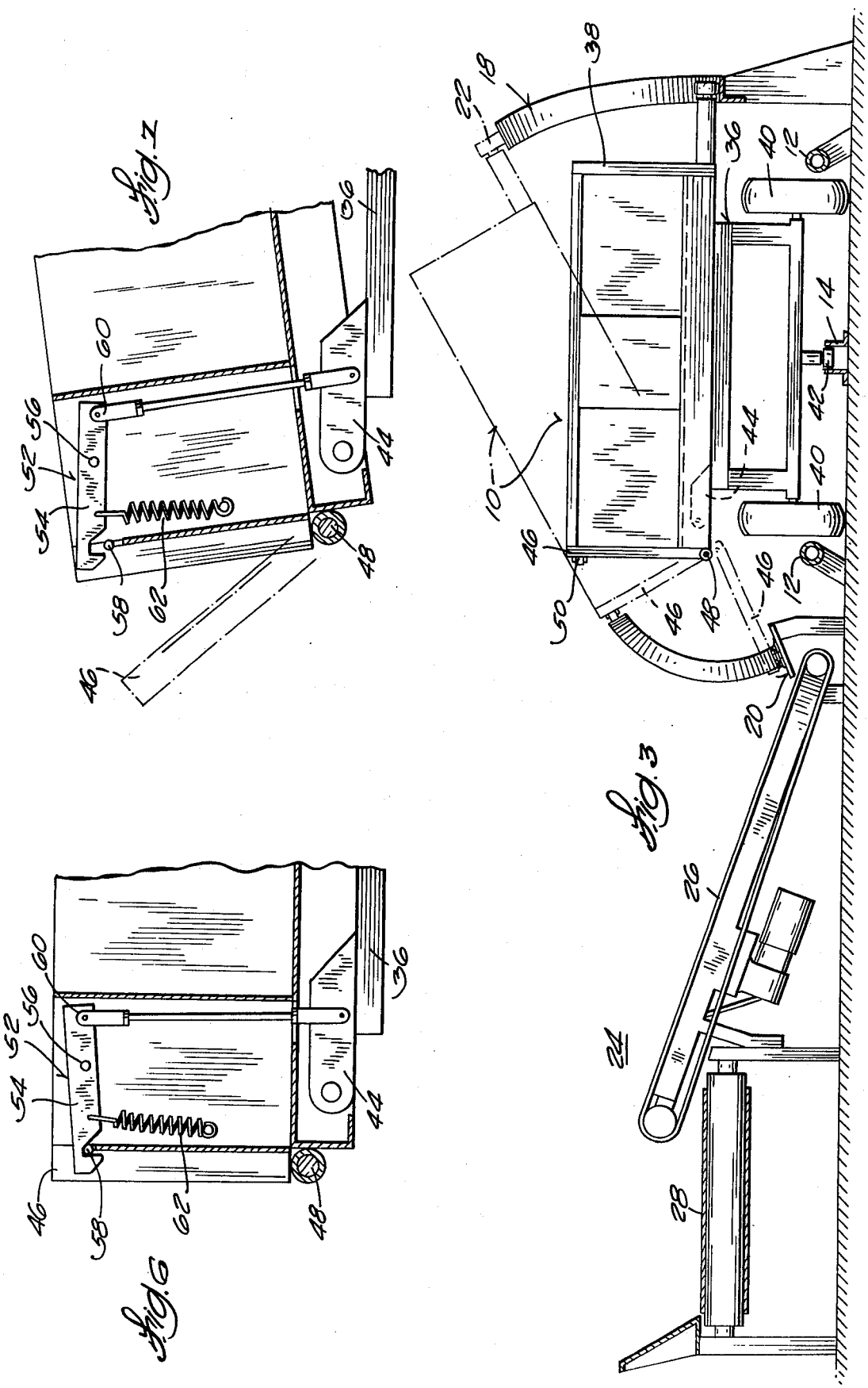

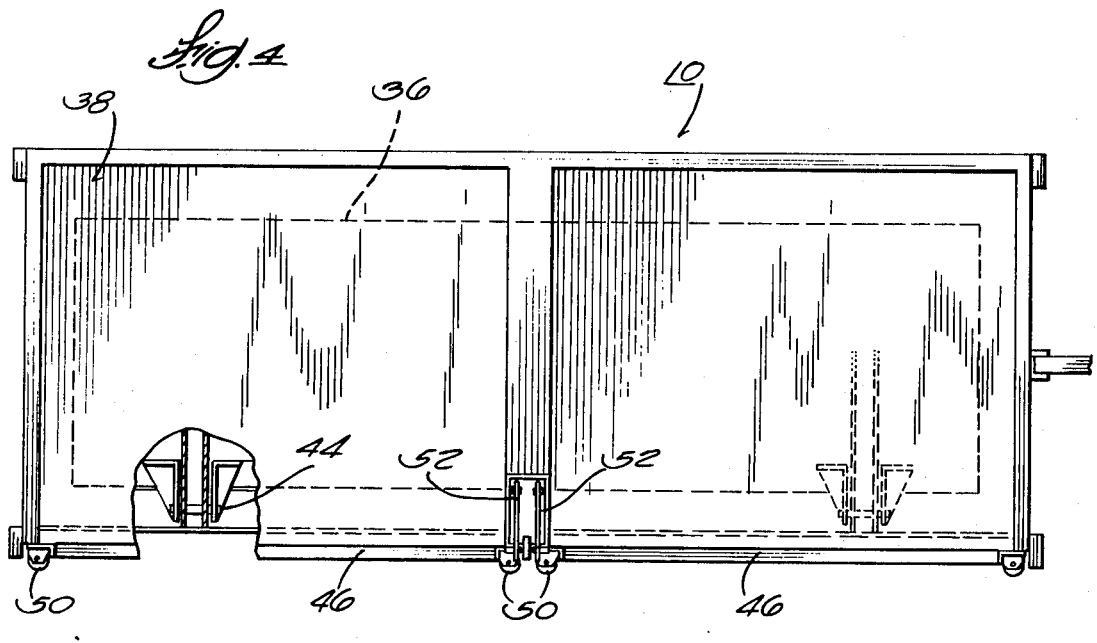
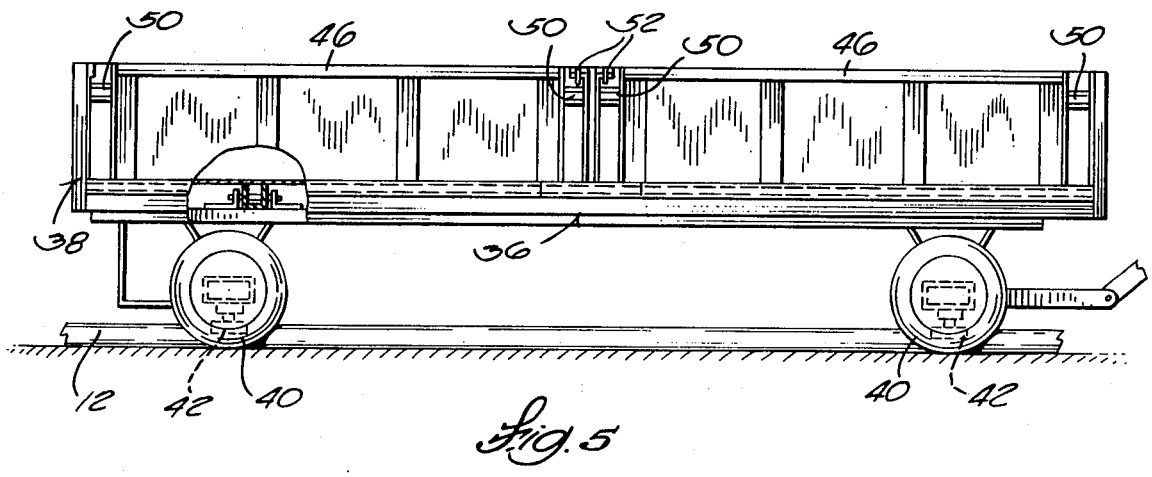

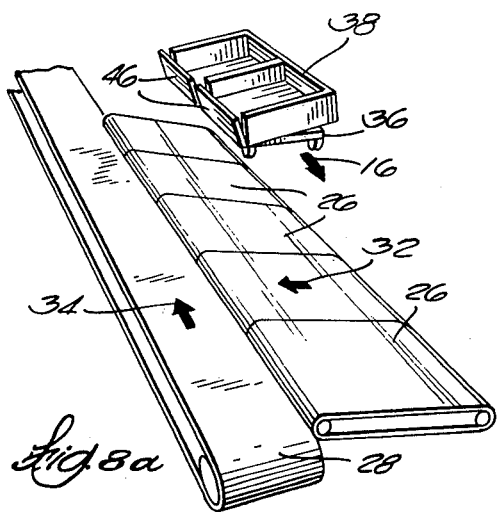
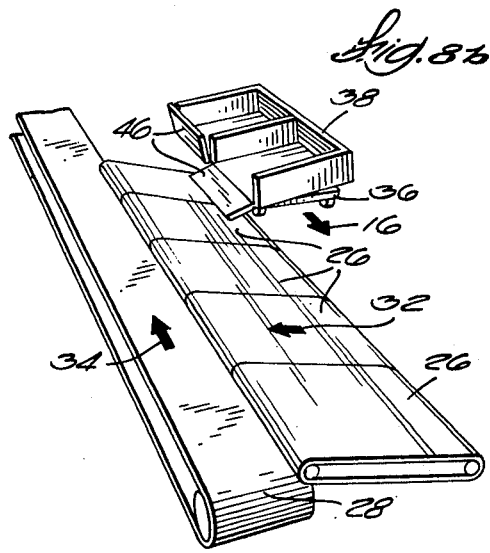
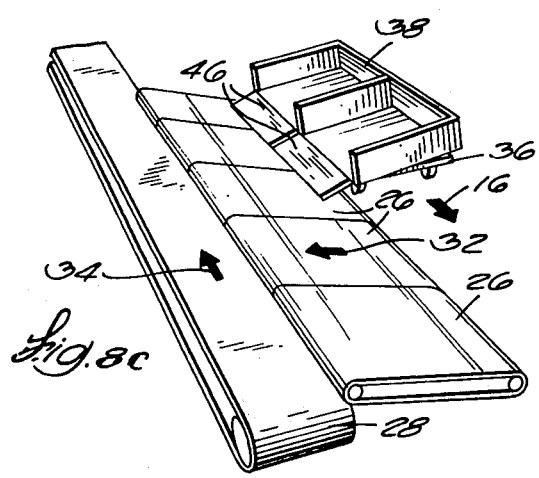
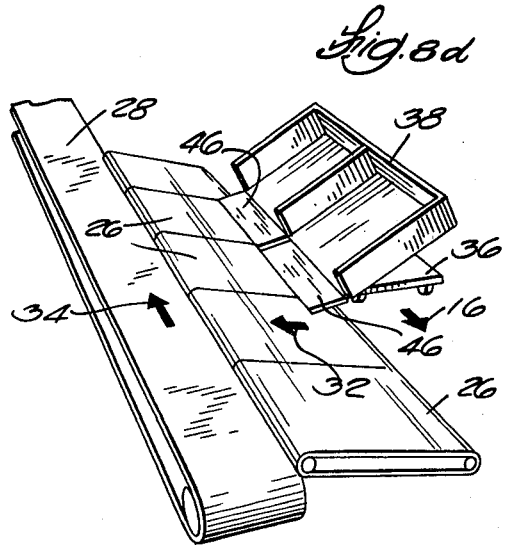
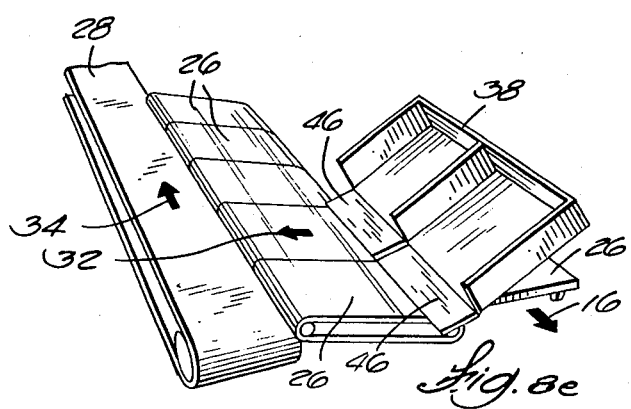

SYSTEM AND APPARATUS FOR MOVING AND UNLOADING ARTICLES

BACKGROUND OF THE INVENTION

1. Field of the Invention

This invention relates to a system and apparatus for the moving and unloading of articles. More particularly, this invention relates to a system using a moving container which pivots about its axis while moving along a predetermined guide path toward an unloading station such that the container is pivoted and its pivotable door is fully opened when it is adjacent to the unloading station.

2. Description of the Prior Art

There is a growing need in industry to have systems which can quickly and efficently move articles from one place to another. This need is particularly evident in our major metropolitan airports and city post offices. Literally millions of pieces of baggage and mail need to be handled daily. The cost, however, of accomplishing this through manual means is becoming exorbitant. There are numerous systems now becoming available which are being utilized by various airports and other similar facilities to move and unload baggage and mail. One exemplary apparatus is described and claimed in U.S. Pat. No. 3,863,781, assigned to the same assignee as the present invention. The invention as described therein is particularly well suited for handling baggage at unloading stations. It is comprised primarily of a carriage moveable along a predetermined guide path with a pivotable container attached to the carriage. The pivoting action of the container is caused by the interaction of a cam roller mounted on the container with a cam rail positioned adjacent the guide path. As the cam rail rises and causes the cam roller to move upward, the container pivots about its axis toward the unloading station. The doors of the unloading station interact with the carriage and container, permitting movement of the baggage from the container into the station.

The present invention, however, is particularly well suited for use with mail and parcels in an environment as experienced in large metropolitan airports. Such an invention is well timed because of the rapidly mounting cost of mail handling and the untenable delays now being experienced by the public in receiving mail. The present invention is designed to further automate and mechanize the unloading of mail from containers onto receiving stations. The design is simple, efficient, and requires little manual attention.

SUMMARY OF THE INVENTION

Fundamentally, the system for moving and unloading articles is comprised of three parts. The first part consists of an apparatus that is used to collect the articles at a remote point and move the articles to an unloading station. The second part is a guide path which prevents undue lateral motion of the apparatus as it approaches the unloading station. The third part is the unloading station itself which generally consists of a conveying means such as a plurality of wide belt conveyors for removing the articles as they are unloaded from the container.

Specifically, the apparatus includes at least one moveable carriage, a container which is adapted to carry a plurality of the articles and is pivotably mounted to the carriage along an axis lying substantially in the direction of the movement of the carriage. A door is pivotably mounted to the container along an axis substantially parallel to the container axis and, in its normal position, is latched to the container in a closed position to prevent the articles from falling out of the container. As the carriage and therefore the container interacts with and moves along the guide path toward the unloading station, the container and the door are caused to pivot in a sequence such that the door reaches its open position preferably prior to the container being fully pivoted. The maximum pivot angle is greater than the angle of repose of the articles in the container thereby causing the articles to slide out of the container across the fully opened door and onto the unloading station.

An additional feature of the present invention is the use of a means to automatically unlatch the door from its closed position as the carriage and container move along the predetermined guide path toward the unloading station. The timed sequence of the various operations are such that initially the door is unlatched, then the door is moved to an open position which can be caused either by positively displacing or biasing the door toward its open position, and finally the container itself is pivoted towards the maximum pivot angle.

The unloading station at the point of unloading of articles is generally comprised of a plurality of conveying belts which move the articles away from the carriage. Next, the carriage continues its movement away from the unloading station while the container is pivoted back to its normal upright position. Finally the door is pivoted to its closed position and latched, all of which is accomplished automatically.

BRIEF DESCRIPTION OF THE DRAWINGS

FIG. 1 is a plan view of an unloading station and cam rails employing the present invention.

FIG. 2 is a side view of the cam rails seen in FIG. 1 but with the unloading station and other elements omitted.

FIG. 3 is a front view of the carriage and container positioned adjacent the unloading station.

FIG. 4 is a plan view of the carriage and container with top portions broken.

FIG. 5 is a side cross-sectional view of the carriage and container with side portions broken.

FIG. 6 is an enlarged section of a closed latch mechanism forming part of the invention.

FIG. 7 is the same view as FIG. 6 but with the latch mechanism in an open position.

FIGS. 8A – 8E depict a schematic perspective of the sequential operation of the system.

DETAILED DESCRIPTION OF THE PREFERRED EMBODIMENT

FIG. 1 portrays schematically in plan view the general aspects of the present invention. A plurality of carts 10 are positioned intermediate guide rails 12 and associated with guide tracks 14 which together define a guide path for the constrained motion of carts 10 therealong. The motion of carts 10 is depicted by arrow 16. Positioned along and spaced from the guide path are cam rails 18, 20. Associated with each cart 10 is a cam follower 22.

The unloading station depicted generally as 24 is comprised of a plurality of conveyors 26 and a conveyor 28 positioned generally parallel to the guide path. Articles 30 carried in carts 10 are unloaded adjacent the unloading station onto the plurality of conveyors 26 for movement in the direction depicted by arrows 32 and thereafter in the direction depicted by arrow 34.

Reference is now made to FIG. 2 which depicts a side view of the cam rails seen in FIG. 1. For the sake of clarity the carts and unloading station have been omitted. Can rail 18, the function of which is described hereinafter, has generally increasing height portions, 18a, 18b, 18c, and 18d in direction of movement of carts 10. Portion 18e positioned along the guide on the other side of station 24 provides a decreasing height. Cam rail 20 has generally depressed but constant height portion 20b adjacent the unloading station as can be seen by comparing the relative position of cam rail 20 in FIG. 2 with the unloading station as seen in FIG. 1. The elevated portions 20a of cam rail 20 are spaced to occur just prior and subsequent to unloading station 24.

FIG. 3 depicts a front view of a cart 10 positioned along the guide path adjacent the unloading station and, in phantom, cart 10 in its pivoted position as it would appear when adjacent unloading station 24. Cart 10 comprises in part a carriage 36 and a container 38. Carriage 36 appropriately mounted to wheels 40 for motion along the guide path is integrally connected to a track follower 42 for registering with and movement between guide tracks 14. Container 38 is mounted above and pivotably attached to carriage 36 as indicated by the dash lines depicted by character numeral 44. A door 46 is pivotably mounted to container 38 as depicted by hinge 48. Mounted on top of each door are a plurality of cam followers, generally a roller, for cooperation with cam rail 20 in a manner to be described hereinafter.

FIG. 3 further illustrates in phantom the pivoting action of container 38 about carriage 36 and door 46 about its axis mounted to container 38. As should be noted from the figure, the axis of rotation of the container and door are substantially in the direction of movement of carriage 36 along the guide path.

The plan view of a cart 10 as shown in FIG. 4 depicts more readily the pivotably mounting 44 of container 38 to carriage 36 and the plurality of cam followers 50. Carriage 36 may be seen by the dash lines are indicated. As illustrated herein, cart 10 is divided into two containers 38 each with a door 46. Mounted to the left and right-hand sides of the top of each door 46 are cam followers 50. Doors 46 are releasably secured by latch members 52.

Latch member 52 is best seen in FIGS. 6 and 7 which respectively depict enlarged sectional views thereof in closed and open positions. As seen therein, latch member 52 is generally comprised of a pivotably mounted arm 54 mounted about axis 56 on container 38. One end of arm 54 is hook shaped and adapted to lock against pin 58 which is attached to door 46. The other end of arm 54 is pivotably attached to the upper end of rod 60. The lower end of rod 60 is pivotably attached to carriage 36. When, as seen in FIG. 7, container 38 pivots about its axis, linage rod 60 causes arm 54 to pivot clockwise about axis 56 releasing door 46 from container 38. Motion of door 46 toward its open position causes pin 58 to move from the hook of latch 54. Arm 54 is spring biased by spring 62 in a counter clockwise motion to return to its closed position once container 38 pivots back to a horizontal position atop the carriage 36.

The operation of the present invention is best understood by refering to FIGS. 2, 3 and 7. As cart 10 is caused to move down the guide path and constrained against undue lateral motion by cam rails 12 and guide tracks 14, cam follower 22 contacts cam rail 18 at a point thereon depicted as portion 18a. Container 38 begins to pivot about its mounting 44 to a predetermined angle with respect to the horizontal, preferably about 10°. The pivoting action of the container about its axis actuates latch members 52 through the clockwise motion of arms 54 causing the release of doors 46 of the forward and rear compartments of container 38. Doors 46 then begin to pivot open and cam followers 50 of each door contact the elevated portion 20a of cam rail 20 cam rail 20 then serves at this point to prevent further opening of door 46. As cart 10 progresses toward the unloading station 24, cam followers 50 of the forward door 46 move down cam rail 20 from the elevated portion 20a to the depressed portion 20b. As can be seen from FIG. 2, this sequence of events occurs during the time period it takes cart 10 to traverse the region of the guide path adjacent horizontal portion 18b of cam rail 18. The forward door 46 of cart 10 is now fully opened as seen in FIG. 8b. Articles which have been pressing against doors 46 then spill onto conveyors 26 partially unloading container 38. The angle between the base of the compartment and the door is now slightly greater than 180° which facilitates the partial unloading. Continued progress of cart 10 then permits the rear door of cart 10 to be fully opened as seen in FIG. 8c. The sequential operation is preferable since it permits time for articles falling onto conveyors 26 from the forward compartment to be moved away from cart 10. This prevents articles from being caught between doors and the conveyor. Cart 10 next moves past portion 18c of cam rail 18, thus causing the container 38 to further pivot to its maximum predetermined angle. This maximum angle generally about 30° with respect to the horizontal, is equal to or greater than the angle of repose of the articles within container 38. As should be noted from FIG. 2, cart 10 is adjacent the depressed portion 20b of rail 20 and portion 18d of rail 18. Continued movement of cart 10 past the unloading station causes cam follower 22 to move down cam rail 18 and cam followers 50 to move up cam rail 20, thereby pivoting container 38 back to its horizontal position and closing door 46. As before, doors 46 close as they open, i.e., sequentially. Latching of doors 46 occurs after container 38 reaches its horizontal position.

While the present invention has been illustrated by a detailed description of a preferred embodiment, it will be obvious to those skilled in the art that various changes and modifications could be made without departing from the scope and spirit of the invention as defined in the appended claims. For example, the particular configuration of the cam rails, cam surfaces, and their respective positions could be modified without departing from the invention as defined.

What is claimed is:

1. A system for the handling of articles including an apparatus for moving and unloading articles, a guide means for constraining movement of the apparatus along a predetermined path, and an unloading station adjacent the path and adapted to receive articles unloaded from the apparatus comprising:
   a. said apparatus having
      1. at least one moveable carriage,
      2. a container adapted to carry a plurality of the articles and pivotably mounted to said carriage along an axis lying substantially in the direction of movement of said carriage,
      3. a plurality of doors even pivotably mounted along its bottom edge to said container about an axis substantially parallel to the pivot axis of said container, 4. door securing means associated with each of said doors for releasably securing said door to said container, b. door release means for causing the door securing means to unlatch said doors from said container at a predetermined point along the path;

c. door impeding means for impeding the rapid opening of the doors and for sequentially allowing each door to fully open after being unlatched when each of said doors reaches a first predetermined position adjacent the unloading station; and d. door closing means for sequentially closing each door as each of said doors moves past a second predetermined position.

2. The system of claim 1 in which said door release means causes the container to pivot about its axis toward said doors to a first predetermined angle in response to movement of said apparatus along the guide path toward the unloading station thereby causing said door securing means to unlatch said doors; and further including a container tilting means becoming operative after said doors are fully opened and causing said container to pivot to a second predetermined angle in response to further movement of said apparatus along the guide path toward the unloading station whereby said articles are unloaded over said door on to the unloading station.

3. The system of claim 2 wherein said door release means and said container tilting means comprise respectively first and second portions of first elevated cam rail extending along the path toward said station, said second portion having greater height with respect to said first portion, said container having a cam follower adapted to ride upon said portions of said cam rail.

4. The system of claim 3 in which said impeding means includes a second elevated cam rail positioned adjacent the path with diminishing height in the direction of the station, said impeding means also including a cam follower attached to said door and adapted to ride upon said second rail, said door being biased to pivot open and against said rail.

5. The system of claim 3 in which the door closing means includes another elevated cam rail progressively elevated along the path away from said station on the side of the station opposite the first cam rail.

6. The system of claim 5 wherein said door securing means comprises a latch element secured to said door, a latch member pivotably mounted on said container immediate its ends and adapted to lock onto said element at its one end, said member linked to said carriage at its other end such that said latch pivots in response to one pivoting movement of said container about its axis.

7. The system of claim 6 in which said door is biased toward its open position and said impeding means permits said door to open to its full position when the door reaches a predetermined point adjacent the station.

* * * * *

UNITED STATES PATENT AND TRADEMARK OFFICE
CERTIFICATE OF CORRECTION

PATENT NO. : 4063656
DATED : 20 December 1977
INVENTOR(S) : Gerald G. Lambert

It is certified that error appears in the above-identified patent and that said Letters Patent are hereby corrected as shown below:

Col. 3, line 41, "are" to --as--

Col. 4, line 68, "even" to --each--

Col. 6, line 3, "of first" to "of a first"

Signed and Sealed this

Twenty-seventh Day of January 1981

[SEAL]

Attest:

RENE D. TEGTMEYER

Attesting Officer

Acting Commissioner of Patents and Trademarks